(12) United States Patent
Smith et al.

(10) Patent No.: US 6,530,666 B1
(45) Date of Patent: Mar. 11, 2003

(54) FOCUSING PROJECTION DISPLAYS

(75) Inventors: Ronald D. Smith, Phoenix, AZ (US); Kannan Raj, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/329,434

(22) Filed: Jun. 10, 1999

(51) Int. Cl.[7] .................. G03B 21/00; G03B 21/14; G03B 21/22; H04N 9/31; G02B 5/32
(52) U.S. Cl. .................. 353/121; 353/101; 353/69; 353/76; 353/31; 348/744; 348/745; 359/15; 359/443; 359/460; 349/5
(58) Field of Search .................. 353/122, 101, 353/69, 76, 121; 349/5, 6, 7, 8, 9, 64; 359/15, 443, 460, 629; 348/744, 745; 352/140

(56) References Cited

U.S. PATENT DOCUMENTS

| | | | | |
|---|---|---|---|---|
| 5,383,053 A | * | 1/1995 | Hegg et al. ............... 359/486 |
| 5,479,225 A | * | 12/1995 | Kuga .................... 353/101 |
| 5,803,570 A | * | 9/1998 | Chen et al. ............... 353/122 |
| 5,808,589 A | * | 9/1998 | Fergason ................. 345/8 |
| 5,831,601 A | * | 11/1998 | Vogeley et al. ............. 345/175 |
| 6,095,652 A | * | 8/2000 | Trayner et al. ............. 353/10 |
| 6,175,429 B1 | * | 1/2001 | Nagaharu et al. ........... 358/475 |
| 6,188,427 B1 | * | 2/2001 | Anderson et al. ........... 347/225 |
| 6,196,687 B1 | * | 3/2001 | Smith .................... 353/31 |
| 6,246,446 B1 | * | 6/2001 | Heimbuch et al. .......... 348/750 |
| 6,285,349 B1 | * | 9/2001 | Smith .................... 345/147 |
| 6,301,027 B1 | * | 10/2001 | Popovich ................. 359/15 |
| 6,327,231 B1 | * | 12/2001 | Sano et al. ............... 369/44.23 |
| 6,416,185 B1 | * | 7/2002 | Smith .................... 353/69 |

OTHER PUBLICATIONS

Edward H. Stupp and Matthew S. Brennesholtz, "Projection Displays", 1999, published by John Wiley & Sons, pp. 232 through 236.*

* cited by examiner

Primary Examiner—Russell Adams
Assistant Examiner—Melissa J Koval
(74) Attorney, Agent, or Firm—Trop, Pruner & Hu, P.C.

(57) ABSTRACT

A system detects reflected light from a projection screen associated with a projection display. Reflected light may be analyzed to determine whether the projector is in focus. This information may be used to create input signals that automatically focus the projection display.

25 Claims, 5 Drawing Sheets

FOCUSING PROJECTION DISPLAYS

BACKGROUND

This invention relates generally to focusing projection displays including displays that may display computer information.

Projection displays may project an enlarged image on a display screen to be more easily viewable, for example, by a number of users. Projection display screens may also be mounted in housings with an image projected on one side of a screen, being viewed on the other side of the screen. In some cases, projection displays may be utilized as the displays for computer systems.

Room type projectors typically incorporate a motorized focus. Sometimes these projectors use remote control devices to enable the user to adjust the focus without having to return to the projector. However, the measurement of focal error is still a manual process, controlled by the operator.

High end slide projectors may include an autofocus feature. It has been empirically observed that the absolute location of the image plane varies from slide to slide. Thus, the focal plane of the lens varies as one gives a slide presentation. Instead of manually adjusting the focus for each slide, the projector adjusts the focus from slide to slide. While this produces a consistent result, current autofocus systems do not correctly focus each slide to account for the image plane of the slide. In other words, autofocus slide projectors still show out of focus, but consistently out of focus, slide shows. The burden remains on the operator to readjust for individual slide variations.

Thus, there is a continuing need for better autofocus systems for projection displays.

SUMMARY

In accordance with one aspect of the present invention, a method of projecting images onto a display surface includes forming a first image. The first image is projected onto a display surface to form a second image. Information about the second image, reflected from the display surface, is received and information about the second image is compared to the information about the first image.

DETAILED DESCRIPTION

Figure 1:
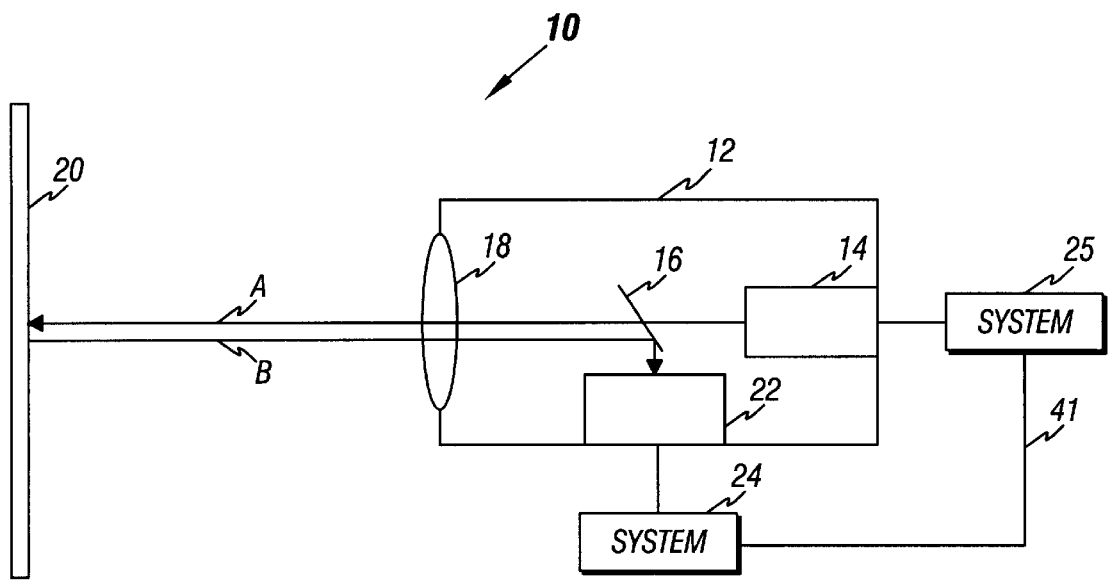
FIG. 1 is a schematic depiction of one embodiment of the present invention.

Referring to FIG. 1, a projection display 10, in one embodiment of the invention, may include a projection device 12 which projects a light beam A onto a screen 20. As examples, the projection display may use transmissive or reflective liquid crystal techniques or the projection display may be a Schlieren optical projector. The beam A may be reflected by the screen 20, at least in part, back towards the projection device 12. In one embodiment of the invention, the system detects the returning, reflected light beam B using a sensor 22. A system 24 uses information about the returning light to adjust the focus of the display or the system 25 controlling the display. The sensor 22 may include one or more digital video cameras in one embodiment.

In one embodiment of the present invention, the projector device 12 may include a projector such as a light valve 14 which generates output light for projection. The light valve 14 may include a liquid crystal display (LCD) such as a reflective or a transmissive LCD. That output light may pass unaffected through a beam splitter 16 to be projected onto the screen 20 using a projection lens 18. Returning, reflected light, indicated as B in FIG. 1, passes back through the lens 18 and is reflected by the beam splitter 16 to be captured by the sensor 22. The beam B may convey information about the focus of the image displayed on the screen 20.

The light valve 14 may receive a video signal from a processor-based system 25 while the sensor 22 may be coupled to a processor-based system 24. For example, the systems 24 and 25 may be coupled by a bus 41 which may be a Video Electronics Standards Association (VESA) interface. The VESA standard is further described in the Computer Display Timing Specification v.1, rev. 0.8, (available from VESA, San Jose, Calif. 95131 or on the Internet at www.vesa.org/standards.html). Alternatively, a digital interface may be used as described in the Digital Visual Interface (DVI) Specification, Revision 1.0, Apr. 2, 1999, prepared by the Digital Display Working Group (DDWG).

Figure 2:
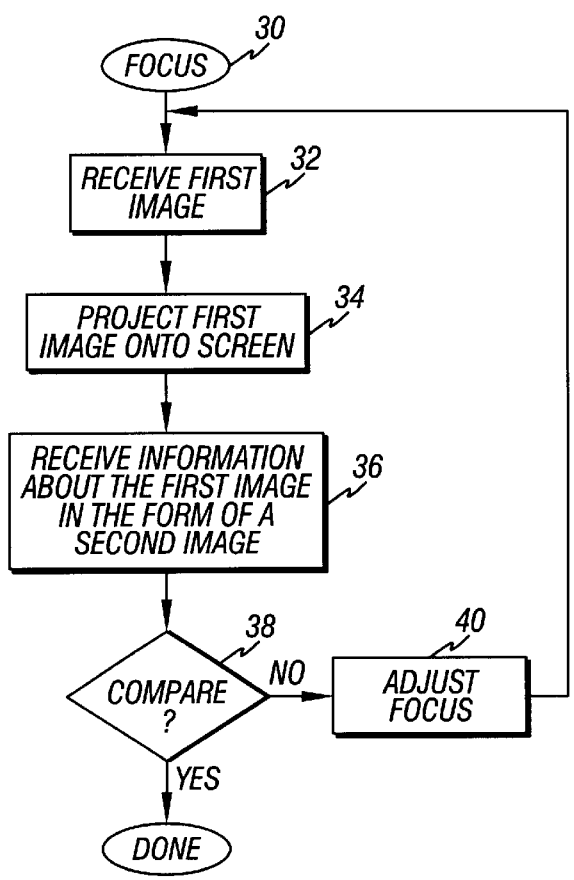
FIG. 2 is a flow chart showing software for implementing one embodiment of the present invention.

Referring next to FIG. 2, the software 30 for providing an autofocus feature in the embodiment shown in FIG. 1 may begin by receiving a first image to be displayed by the light valve 14 as indicated at block 32. The software 30 may be stored on the system 24, for example. The first image is then projected onto a screen 20 using the projection device 12, as indicated in block 34. Information about the first image is received, in the form of a second image, by the sensor 22, as indicated in block 36.

The image received for projection by the light valve 14 from the system 25 and the image received by the sensor 22 and the system 24 are then compared as indicated in diamond 38. If they are sufficiently similar in focus, as described hereinafter, the flow ends. Otherwise, the focus is adjusted as indicated in block 40.

Figure 3:
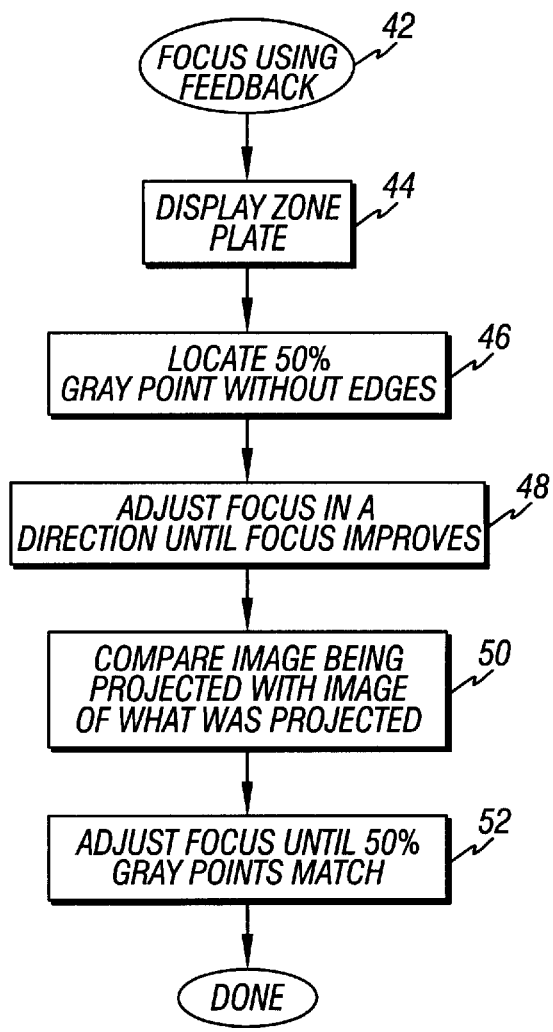
FIG. 3 is a flow chart showing software for implementing another embodiment of the present invention.
Figure 4:
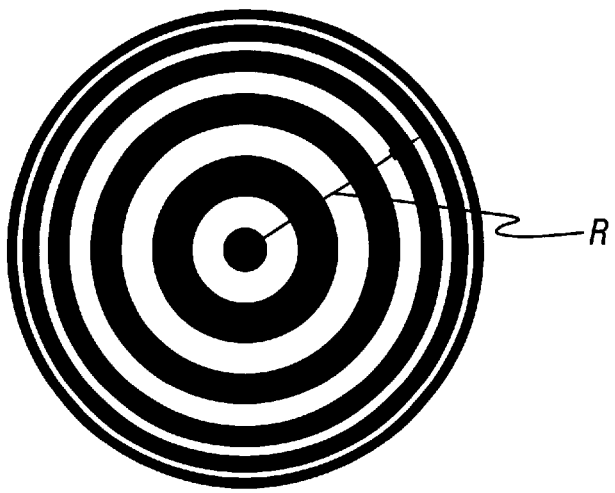
FIG. 4 is a simplified depiction of a circular zone plate.
Figure 5:
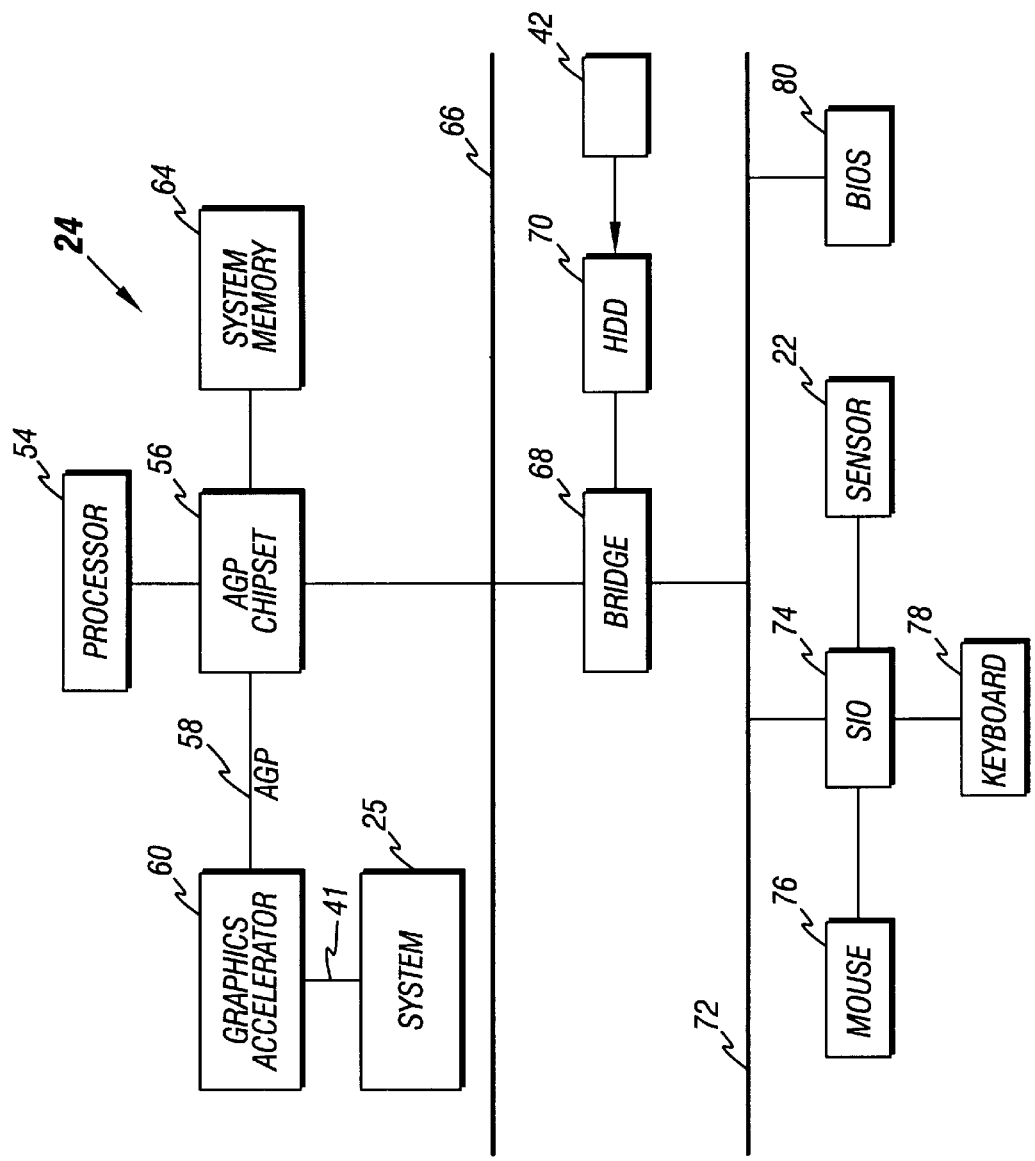
FIG. 5 is a block diagram showing one embodiment for implementing a computer which drives a projection display.

Referring next to FIG. 3, software 42 for implementing one embodiment of an autofocus feature for embodiments of the type shown in FIG. 1 begins by displaying a circular zone plate as indicated at block 44. The software 42 may be stored, for example, in the system 24 as shown in FIG. 5. A zone plate includes a plurality of circles of decreasing intra-circle spacing as shown in a simplified depiction in FIG. 4. The software 42 may be used in a calibration mode in one embodiment.

The image of the zone plate displayed by the projection system is then analyzed to locate the point of 50 percent gray scale value without edges, in one embodiment of the invention. This corresponds to the point where the adjacent circles merge together to form a 50 percent gray scale image without showing circle edges, as indicated in block 46.

The 50 percent gray scale value is a function of the type of sensor used. If the sensor is a black/white sensor, the operation is straightforward. If the image sensor is a Bayer tiled sensor, for example, the recorded values from the sensor may be scaled by color to their equivalent luminance values.

The focus is then adjusted in either of two directions, either towards or away from the projection screen, until the focus is sharper. In other words, the focus is adjusted in a first direction to determine if the focus improves and then in a second direction if the focus did not improve by the adjustments in the first direction, as indicated in block 48.

Next, the projected image is compared with the image of what was projected as indicated in block 50. If the point of the 50 percent gray scale is at the same radial distance, or substantially the same radial distance (the distance R for example, on the zone plate shown in FIG. 4) in both images, the display is substantially in focus and the autofocus flow is complete. Otherwise, the focus is adjusted until the 50 percent gray scale points substantially match as indicated in block 52.

Referring to FIG. 5, in one embodiment, the system 24 may include a processor 54 coupled to an accelerated graphics port (AGP) chipset 56 for implementing an accelerated graphics port embodiment (see the Accelerated Graphics Port Interface Specification, version 1.0, published on Jul. 31, 1996, by Intel Corporation, Santa Clara, Calif.). The chipset 56 may communicate with the AGP port 58 and the graphics accelerator 60. The system 25 may be coupled to receive the output signal from the graphics accelerator 60. The chipset 56 may also be coupled to the system memory 64 and to a bus 66.

The bus 66 may be coupled to a bridge 68 which in turn is coupled to a hard disk drive 70. The hard disk drive may store the software 42 in one embodiment of the present invention. The software 42 is executed by the processor 54.

The bridge 68 may also couple another bus 72 which is in turn coupled to a serial input/output (SIO) device 74. The device 74 may receive serial inputs from the sensor 22, a mouse 76 and a keyboard 78. Also coupled to the bus 72 is a basic input/output system (BIOS) 80.

Figure 6:
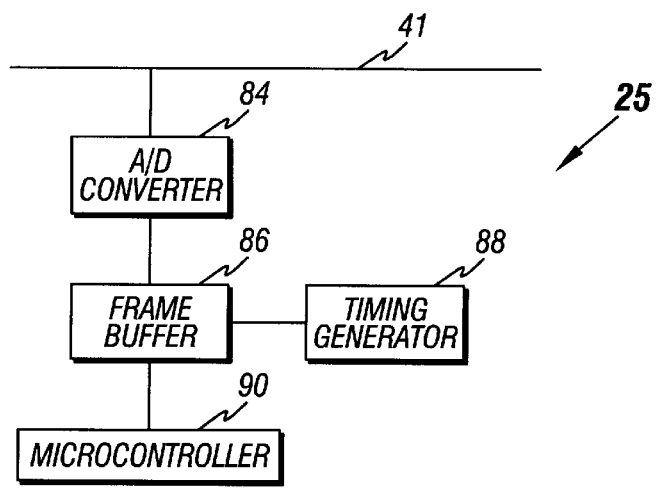
FIG. 6 is a block diagram of one embodiment of hardware for controlling a projection display.

Turning next to FIG. 6, in one embodiment, the system 25 for controlling the light valve 14 may be coupled to a bus 41, such as a VESA local bus. The bus 41 in turn is coupled to an analog to digital converter 84. The converter 84 may receive information from a frame buffer 86 controlled by a timing generator 88. A microcontroller 90 may store information for controlling the light valve 14. For example, the microcontroller 90 may store information which provides gamma correction and color conversions for a particular display or light valve.

Figure 7:
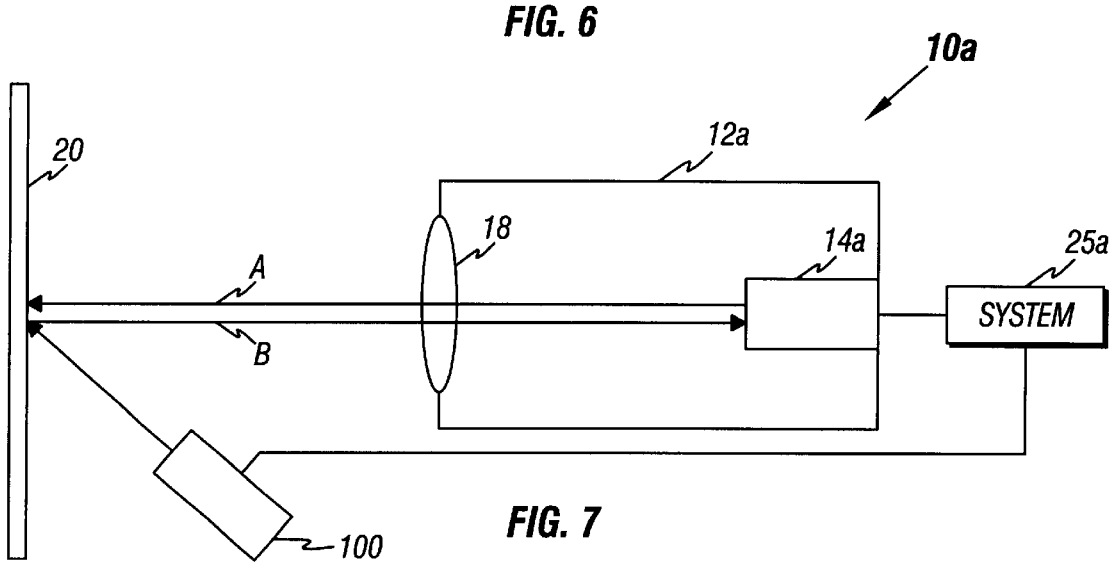
FIG. 7 is a schematic depiction of another embodiment of the present invention.

In accordance with still another embodiment of the present invention, a system 10a, shown in FIG. 7, includes a projection device 12a including projection optics 18 and a light valve 14a coupled to a host system 25a. The light valve 14a produces a first beam A which is displayed on a display screen 20. A beam B, reflected from the display screen 20, returns to the light valve 14a to enable focus adjustments in the light valve 14a in concert with the system 25a. An infrared projector 100, under control of the system 25a, may project an infrared image on the screen 20, which is at least partially reflected toward the light valve 14a along the beam B.

In one embodiment of the present invention, the projector 100 may include an array of infrared emitting diodes that project a zone plate image under control of the system 25a. This image may have the same focal settings as a visible light image produced by the light valve 14a. Thus, the image transmitted by the system 25a for projection can be compared to the reflected infrared image to make focus adjustments. By making corresponding adjustments in the projector 100 and the light valve, the image from the projector 100 may be used to adjust the focus of the device 12. If the focal lengths of the projector 100 and light valve 14a are different, appropriate correction factors may be used.

Figure 8:
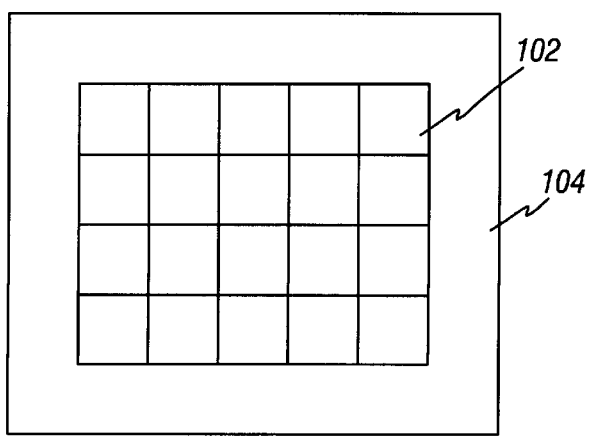
FIG. 8 is a schematic depiction of a light valve useful in the embodiment shown in FIG. 7.

Referring to FIG. 8, the light valve 14a may include a modulating region 102 surrounded by an image forming region 104. Thus, the region 102 may be, for example, a spatial light modulator and the region 104 may be a plurality of digital image sensors formed of complementary metal oxide semiconductor (CMOS) or charge coupled device (CCD) image sensors. In one embodiment of the invention, regions 102 and 104 may be formed in the same silicon substrate using liquid crystal over semiconductor (LCOS) technology.

Figure 9:
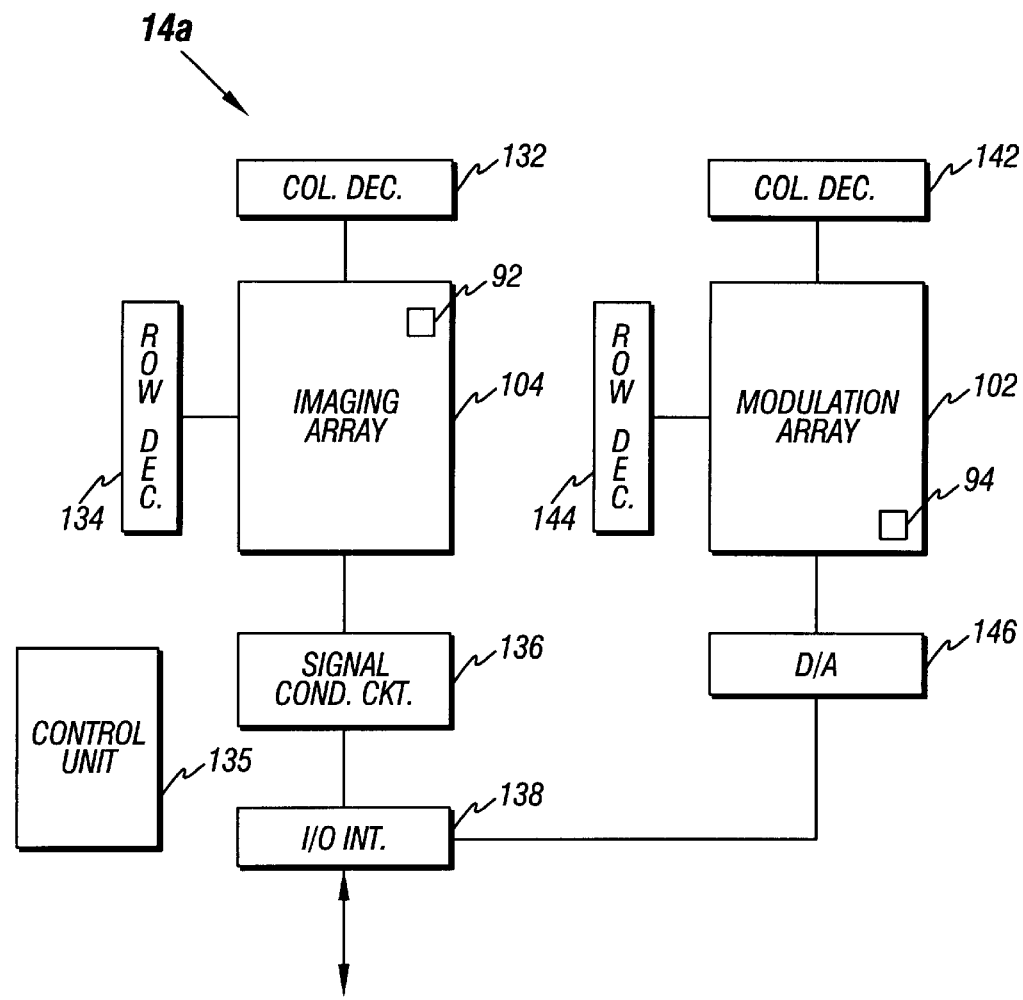
FIG. 9 is a block depiction of a light valve useful in the embodiment of FIG. 7.

Referring to FIG. 9, the light valve 14a may include an imaging array 104 of light sensors 92 and a modulation array 102 of pixel cells 94. In this manner, the light valve 14a may include column 132 and row 134 decoders to access the light sensors 92 of the imaging array 104. Signal conditioning circuitry 136 may retrieve analog indications of the sensed intensities from the imaging array 104, filter noise from these indications and provide digital indications to an input/output (I/O) interface 138. Similarly, column 142 and row 144 decoders may access the pixel cells 94 of the modulation array 140 to provide voltages from a digital-to-analog (D/A) converter 146 to the array 102. The D/A converter 146 may receive digital signals from the I/O interface 138. The light valve 14a may include a control unit 135 to coordinate the above-described activities of the light valve 14a.

The image information developed by the imaging array 104 may then be used for comparison to the image that was developed for projection by the modulation array 102. Thereafter, the comparison and focus correction operation may proceed in accordance with the techniques described in connection with the embodiment illustrated in FIG. 1.

In one embodiment of the invention, the projection system 14a may include filters to effectively multiplex the wavelengths of the infrared light wave and the modulated beam. In this manner, the filters may band limit the incoming infrared light wave and the outgoing modulated beam so that the infrared light wave and the modulated beam exist on separate optical channels, an arrangement that permits both the infrared light wave and the modulated beam to concurrently exist in the system 10a.

Figure 10:
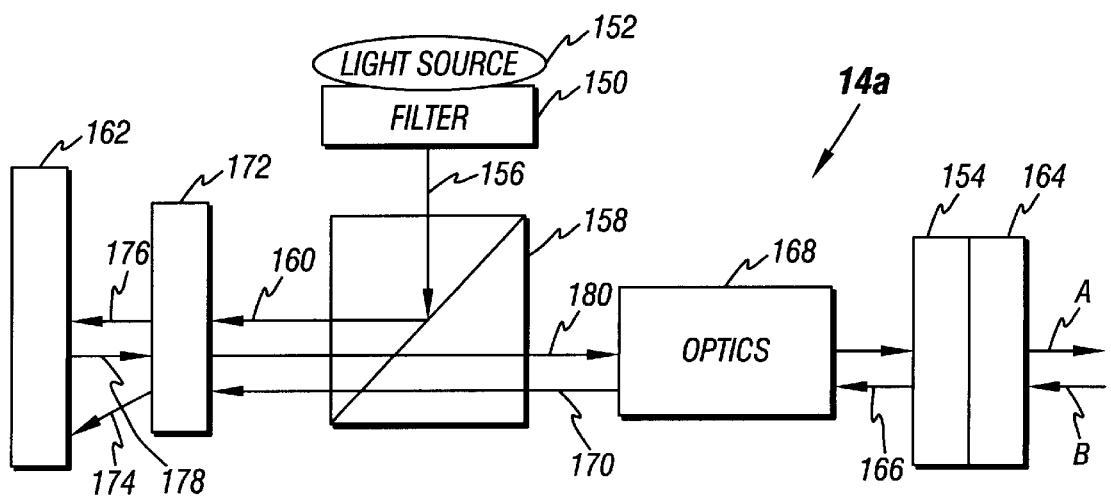
FIG. 10 is a more detailed block depiction of the light valve of FIG. 9.

More particularly, a filter 150, shown in FIG. 10, may band limit the unmodulated beam from the light source 152 to ensure that most of the spectral energy of the modulated beam is associated with wavelengths in the range of approximately 400 to 780 nanometers (nm), and a filter 154 may filter the incoming infrared light wave to ensure that spectral components of the infrared light wave that travels through the optical system 168 have wavelengths greater than approximately 780 nm. As a result of this arrangement, an optical channel is created inside the system 10a to direct the infrared beam to the sensor 104 (FIG. 8) and a display optical channel is formed inside the projection system to direct the modulated beam from the pixel cells 94 to form the image.

More particularly, FIG. 10 depicts a side view of, a portion of the light valve 14a. To form the displayed image, an unmodulated beam follows an optical path 156 from the light source 152 toward a polarizing beam splitter 158. The polarizing beam splitter 158, in turn, directs the unmodulated beam along an optical path 160 that generally extends toward a spatial light modulator (SLM) 162.

The infrared light wave is directed to the light sensors 104 in the following manner. The infrared light wave is incident upon the exterior surface 164 of the light valve 14*a*. In this manner, the filter 154 filters the infrared light wave to produce a band-limited infrared beam that follows an optical path 166. Traveling along the optical path 166, the infrared beam encounters optics 168 that direct the infrared light wave toward and along an optical path 170 that generally extends toward the SLM 162. In some embodiments, the optical paths 160 and 170 may be substantially parallel to each other.

In some embodiments, to direct the infrared and unmodulated beams to the SLM 162, the light valve 14*a* may include a holographic beam splitter 172 that receives the infrared and unmodulated beams and diffracts each beam based on the wavelengths of the spectral components of the beam, i.e., the holographic beam splitter 172 diffracts each beam based on its associated optical channel. Thus, the diffraction imposed by the holographic beam splitter 172 to the unmodulated beam is different than the diffraction imposed by the holographic beam splitter 172 to the infrared beam. As a result, these two beams exit the holographic beam splitter 172 along diverging separate optical paths 174 (for the feedback optical channel) and 176 (for the display optical channel) toward the SLM 162.

As an example, the unmodulated beam enters holographic beam splitter 172 along the optical path 160. The angle at which the unmodulated beam exits the holographic beam splitter 172 is controlled by an interference pattern (called a hologram) that is associated with the display optical channel and is stored in the holographic beam splitter 172.

Similarly, the holographic beam splitter 172 stored a hologram that is associated with the control optical channel. In this manner, this hologram diffracts the infrared beam to cause the infrared beam to exit at an angle and follow the optical path 174. Thus, each stored hologram is associated with a different optical channel, and because each hologram is highly wavelength selective, each hologram does not diffract the beam that is associated with the other channel.

Once modulated by the SLM 162, the resultant modulated beam returns along a path similar to the path that is traveled by the unmodulated beam. More particularly, the modulated beam follows an optical path 178 back to the holographic beam splitter 158. The optical path is parallel to but directionally opposed to the optical path 160. The modulated beam enters the holographic beam splitter 172 along a path 178 and angle exits the opposite face of the holographic beam splitter 172 along an optical path 180 that approximately follows (in a reverse direction) the optical path 160 that is followed by the unmodulated beam. The modulated beam follows the optical path 180 through the polarizing beam splitter 158 and the projection optics 168 that focus the modulated beam to form the display image along the beam A.

While the present invention has been described with respect to a limited number of embodiments, those skilled in the art will appreciate numerous modifications and variations therefrom. It is intended that the appended claims cover all such modifications and variations as fall within the true spirit and scope of the present invention.

What is claimed is:

1. A method of projecting images onto a display surface comprising:

forming a first image and developing information about said first image;

projecting said first image onto a display surface to form a second image;

receiving information about said second image reflected from said surface; and comparing said information about said second image to information about said first image.

2. The method of claim 1 including projecting said first image as a light beam and splitting said light beam such that outgoing light is passed and incoming information reflected from said surface is reflected to a detector.

3. The method of claim 1 including developing signals based on said information to correct the focus of the second image.

4. The method of claim 1 wherein forming a first image includes using a light valve to form said first image and wherein receiving information about said second image reflected from said surface includes receiving said information about said second image in the light valve that produced the first image.

5. The method of claim 4 wherein receiving information about said second image includes receiving information about only a portion of said second image.

6. The method of claim 1 wherein projecting said first image includes projecting an image of a zone plate.

7. The method of claim 6 wherein comparing includes comparing information about the distance from the center of said zone plate image to the point where said zone plate image reaches a predefined gray level.

8. An article comprising a medium for storing instructions that enable a processor-based system to:

develop information about a first image;

cause a first image to be projected onto a display surface to form a second image;

receive information about said second image reflected from said surface; and compare said information about said second image to said information about said first image.

9. The article of claim 8 further storing instructions that cause a processor-based system to correct the focus of said first image based on the results of said comparison of said information about said second image to the information about said first image.

10. A projection display comprising:

a projector adapted to produce an image that may be projected onto a display surface;

a beam splitter arranged to allow light from said projector to pass and to reflect radiation returning towards said projector;

a sensor arranged to detect radiation reflected by said beam splitter; and a comparator to receive information about said image projected by said projector and to compare information about the image projected by said projector to information about said image received by said sensor.

11. The display of claim 10 wherein said projector is a liquid crystal projector.

12. The display of claim 11 wherein said projector is a reflective liquid crystal projector.

13. The display of claim 10 wherein said projector is controlled by a processor-based system.

14. The display of claim 10 wherein the projector is a transmissive liquid crystal projector.

15. The display of claim 10 wherein the projector is a Schlieren optical projector.

16. The display of claim 10 wherein said sensor is coupled to a controller adapted to provide signals for correcting the focus of said image projected by said projector.

17. A projection display comprising:
- a projector adapted to produce an image that may be projected on a display surface, said image including information;
- a spatial light modulator including a first portion adapted to receive information about the image projected by said projector; and
- a comparator adapted to compare information about the image produced by said projector to information received by said modulator about the image produced by said projector.

18. The display of claim 17 wherein said spatial light modulator includes a second portion adapted to modulate image information.

19. The display of claim 17 wherein said comparator is further adapted to correct the focus of said projector in response to the comparison of information about the image produced by said projector to information received by said modulator about the image produced by said projector.

20. The display of claim 17 wherein said projector and said modulator produce light of different wavelengths.

21. The display of claim 20 wherein said projector projects a zone plate image.

22. The display of claim 20, said modulator including a holographic plate which diffracts different wavelengths differently.

23. The display of claim 20 including a projection device that includes said modulator, said projection device providing light in the visible spectrum and said projector producing infrared radiation.

24. The display of claim 23 wherein said projection device includes a holographic plate that diffracts infrared light and visible light towards said modulator at different angles.

25. The display of claim 24 wherein said comparator is a processor-based system that compares said images produced by said projection device and said projector.

* * * * *